April 1, 1952  B. J. LAZAN  2,591,444
FATIGUE TESTING MACHINE
Filed Oct. 22, 1946  2 SHEETS—SHEET 2
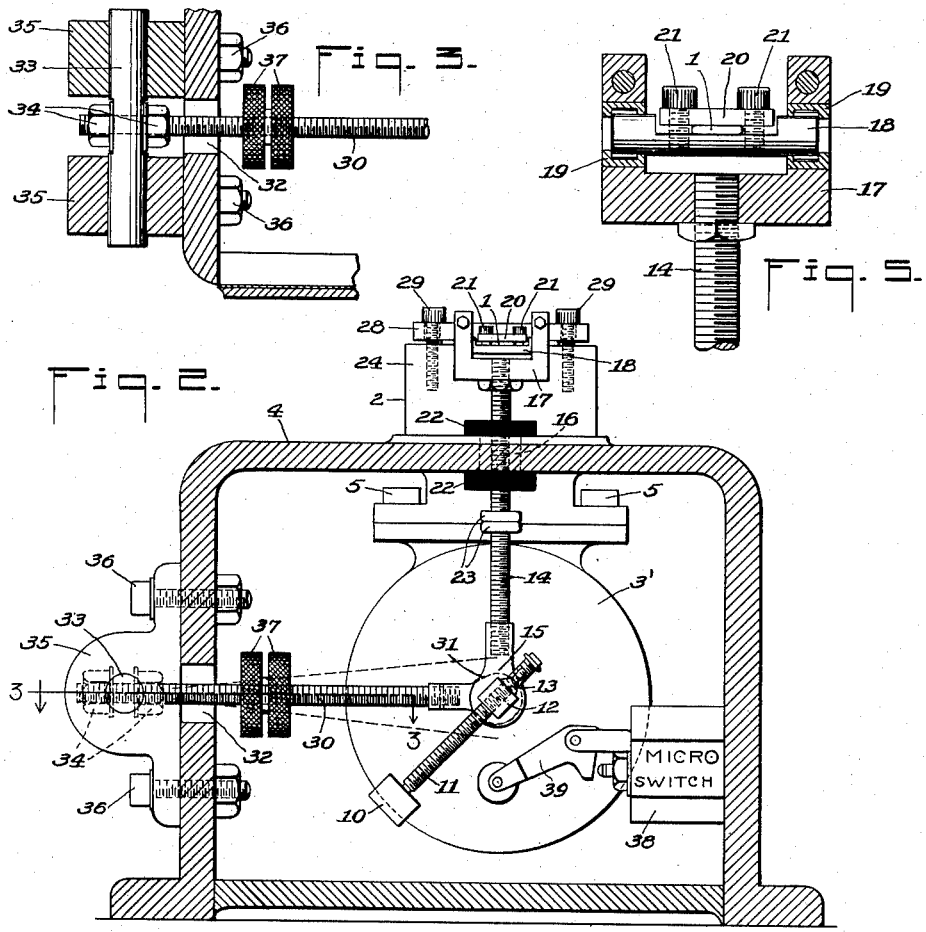
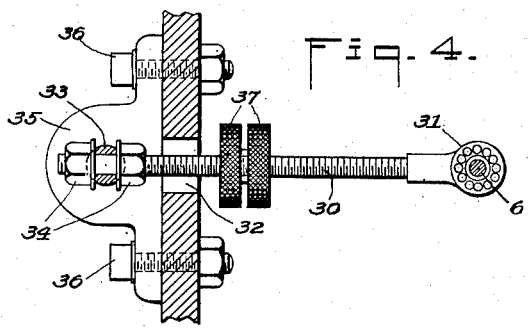
INVENTOR
BENJAMIN J. LAZAN
BY
ATTORNEY Patented Apr. 1, 1952

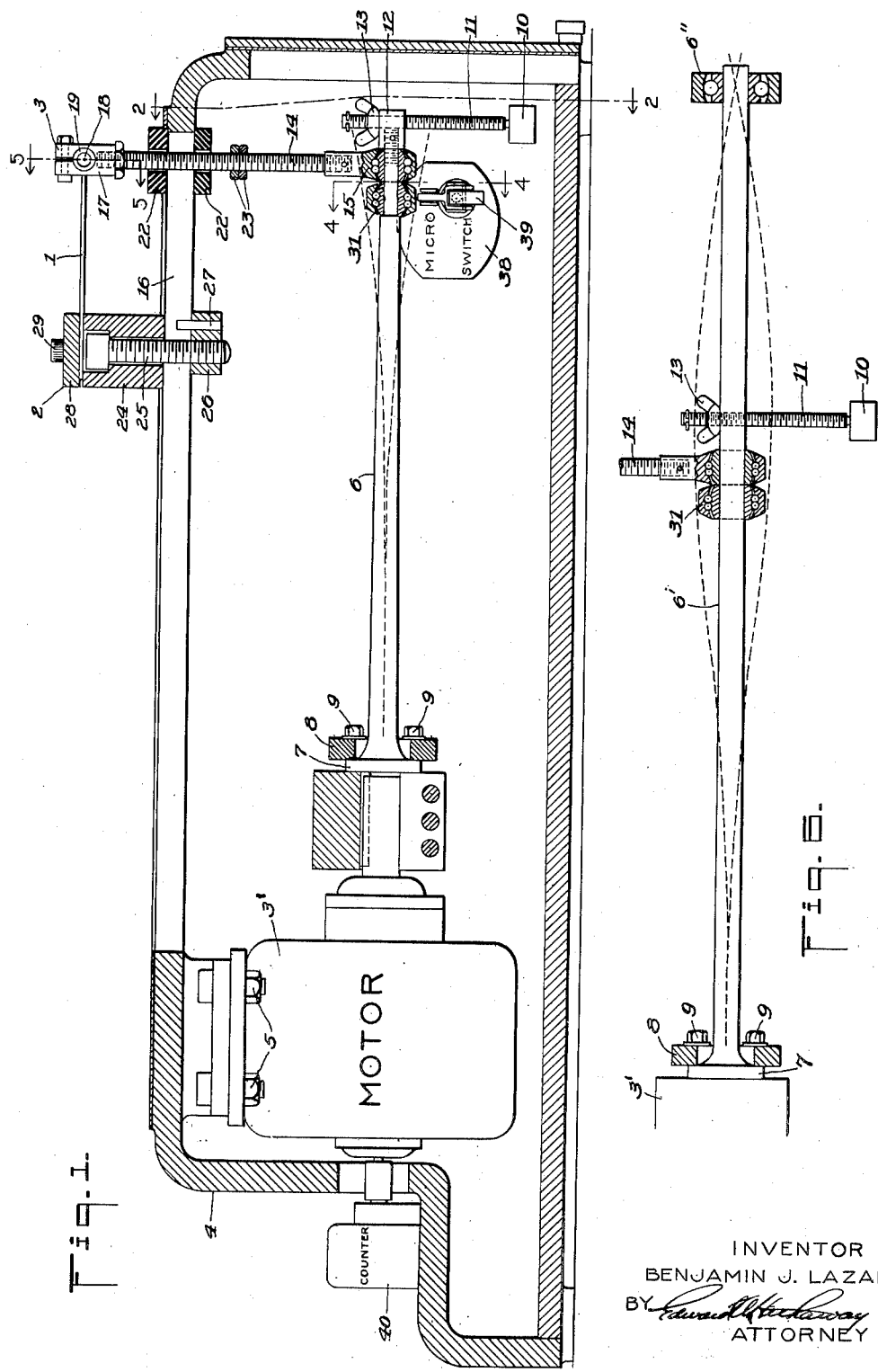

2,591,444

UNITED STATES PATENT OFFICE 2,591,444

FATIGUE TESTING MACHINE

Benjamin J. Lazan, Syracuse, N. Y., assignor, by mesne assignments, to Baldwin-Lima-Hamilton Corporation, a corporation of Pennsylvania Application October 22, 1946, Serial No. 704,814

6 Claims. (Cl. 73—91)

My invention relates generally to inertia compensated materials fatigue testing machines of the below resonance type having an eccentric weight for producing an alternating centrifugal force to be applied to a specimen.

One form of this general type of machine is shown in my co-pending application, Serial No. 569,519, filed December 23, 1944, now U. S. Patent 2,486,567, but it is primarily adapted for producing alternating forces of considerably larger values than is desired in my present invention and therefore such prior machine has certain structural characteristics that are necessary for producing and handling the larger forces and size of specimens therefor. These characteristics, while essential for larger values of force, are not conducive to the low cost, minimum space and low force range which are desired in the invention hereof.

It is an object of my present invention to provide an improved inertia compensated fatigue testing machine of the below resonance type for forces of low magnitude and to provide such a machine that is extremely simple in construction, operation and maintenance and is compact, while at the same time maintaining a high degree of accuracy and sensitivity.

Other objects and advantages will be more apparent to those skilled in the art from the following description of the accompanying drawings in which:

Fig. 1 is a longitudinal sectional view of my fatigue testing machine;

Fig. 2 is a transverse view of the fatigue machine along the line 2—2 of Fig. 1 in the direction of the arrows;

Fig. 3 is a sectional plan view of the pillow blocks, along the line 3—3 of Fig. 2, showing the method by which a guide link is pivotally attached therein;

Fig. 4 is a sectional elevation of said pillow blocks and said guide link, along the line 4—4 of Fig. 1, showing the method of attaching the other end of said guide link to the rotating flexible shaft;

Fig. 5 is an enlarged vertical sectional view of the loading yoke, along the line 5—5 of Fig.1, in the direction of the arrows; and Fig. 6 diagrammatically illustrates a modified inertia compensating shaft supported at each end so as to bend in the center.

In the particular embodiment of the invention disclosed herein, I have shown my machine as used in one specific test, among possible others for which it is adapted, consisting of a flexural test in which an elongated flat specimen 1 is held at one end by a stationary clamp generally indicated at 2 and whose other end is held in a clamp 3 which is reciprocated vertically to apply an alternating fatiguing force to the specimen. To produce the alternating force and at the same time compensate for inertia effects of the moving masses, all in a simple and accurate manner, I provide an electric motor 3', Fig. 1, preferably secured to the underside of the top of a housing 4 by bolts 5. A horizontal shaft 6 constitutes in effect an appreciable extension of the motor shaft, and this shaft extension is preferably, but not necessarily, separate from the motor shaft. This extension is specifically obtained by having the inner end of shaft 6 provided with an annular flange 7 which is connected to the motor shaft substantially co-axially therewith by a suitable collar 8 and bolts 9 that rigidly hold said flange in contact with the motor shaft. This flange and collar connection allows for whatever small amount of lateral adjustment may be necessary of shaft 6 with respect to the motor shaft in order to obtain a balanced running condition of the shaft 6 by itself when no additional elements are attached thereto. Secured to the end of the shaft is a centrifugal force producing eccentric weight 10 which is formed on a screw 11 threaded through a shaft hub 12. The radius of the weight, and therefore the centrifugal force produced thereby, is adjusted by rotating the screw about its own axis to move the weight in or out. A thumb nut 13 locks the screw in any selected position.

As the weight revolves, its centrifugal force causes the shaft 6 to bend so that the shaft end would move in a circle except for the use of means, to be described later, which restrains the shaft in a lateral direction only, thereby allowing complete freedom of alternate bending in a vertical plane. To transmit the centrifugal force to the specimen, I provide a rod 14 preferably threaded throughout its length connected to the shaft by a bearing 15. The upper end of rod 14 passes through a slot 16, running lengthwise of the machine in the top of housing 4 and is adjustably threaded into a specimen loading yoke 17, Figs. 1, 2 and 5 of the movable clamp. Between the vertical arms of loading yoke 17 is a shaft 18, Figs. 2 and 5, journaled in suitable bearings 19, 19, the central portion of loading shaft 18 being recessed in the manner shown in Fig. 5 to accommodate one end of the normally horizontally disposed specimen 1 as shown in Fig. 1. A small plate 20, positioned directly above such recessed portion of loading shaft 18, clamps said end of the specimen in such recess by means of clamp screws 21, 21 which pass through holes in plate 20 and thread into loading shaft 18. Connecting rod 14 also passes loosely through two rubber rings 22, 22 secured to the housing in the position shown in Fig. 1 for the purpose of cushioning the blow of the descending loading yoke 17 and for cushioning the upward movement of limit stop nuts 23, in the event a specimen fails and the load is thus substantially removed from connecting rod 14 or in the event of excessive flexing of the specimen in case of improper adjustment of the centrifugal weight for a given size specimen.

The stationary clamp for the inner end of the specimen has a clamping block 24, adjustably mounted on top of housing 4 over slot 16. Inserted in a vertical hole in clamping block 24 and projecting downwardly through slot 16 is a threaded bolt 25 to the end of which a nut 26 is attached. When the clamping block has been adjusted along said slot to the proper distance from loading shaft 18, in order to receive the other end of the specimen, nut 26 is tightened on bolt 25, securing clamping block 24 firmly to the top of the housing. A pin 27, vertically positioned through nut 26 and extending into slot 16, prevents nut 26 from being turned by vibration of the machine when in operation. A plate 28 securely clamps the other end of the specimen in position by means of clamp screws 29, 29 which pass through holes in said plate and thread into clamping block 24, as shown in Fig. 2. Thus, while this end of the specimen is immovably held, the end of the specimen clamped between shaft 18 and plate 20 is free to be vertically vibrated through the motion of connecting rod 14 and loading yoke 17, bringing about the desired flexure of the specimen.

To restrain lateral movement of the shaft during rotation of the eccentric weight, a radius or guiding link 30, Figs. 2, 3 and 4, preferably threaded throughout its length, has a bearing 31 at one end journaled on the shaft 6 alongside of bearing 15. The other end of the radius link 30 passes through an enlarged opening 32 in the housing and thence through a horizontal rocker shaft 33 to be secured thereto by nuts 34. The rocker shaft is disposed at right angles to link 30 and is journaled in pillow blocks 35 secured to the housing by bolts 36. Link 30 is therefore capable of oscillation in a vertical plane about its cross shaft 33 as a center thereby restraining lateral movement of shaft 6. Two weights 37 are threaded on guide link 30 for adjustment along its length to maintain the vibrating parts at resonance when operated, without a specimen, with any given set of clamps or fixtures. As explained in my said co-pending application a machine of this general type must be in resonance when operated with the additional weight of the fixtures, but without a specimen. If fixtures of different weight are substituted, then the weights 37 are adjusted accordingly. The weight of whatever specimen to be used is of course also to be taken into consideration. With the unloaded machine in resonance, it will, when a specimen is inserted, then operate below resonance due to the resistance of the bending force in the test specimen thereby resulting in an accurately known alternating source being applied to the specimen. The machine is preferably designed so that it is in resonance when the weights are adjusted fully inwardly close to shaft 6 with no fixture or specimen present. This allows for taking care of the largest range of weights of fixtures and specimens in that the adjusted weights 37 can be adjusted outwardly for the full length of the radius link.

Inertia compensation of all reciprocating masses is obtained by utilizing the spring effect of the bending shaft 6. The larger the masses, the stiffer the spring effect should be and hence the shaft may be straight if desired or tapered as shown or instead of being a cantilever it may be a beam 6' supported at one end by the motor as in Fig. 1 and at its outer end by a well known self aligning bearing diagrammatically indicated at 6'', Fig. 6, the eccentric and other links being located at the middle portion where bending would be the greatest. Thus it is seen that the shaft of either type performs dual functions, one to carry and rotate the eccentric weight 10 together with allowing bending to transmit the centrifugal force to the specimen, and, the other, to provide a spring action for counteracting the inertia effects of the moving masses and thereby prevent transmission of inertia forces to the specimen. Hence by merely knowing the radius of the eccentric mass 10, it is possible to calculate with precision the true force that will be transmitted to the specimen. The ability to combine the dual principles of operation in a single shaft is conducive to maximum simplicity, compactness and economy of construction, operation and maintenance.

A micro-switch 38, Figs. 1 and 2, is positioned so that its trigger lever 39 is located directly beneath the vertically vibrating free end of guide link 30. When the specimen fails, the radius guide link 30 strikes the trigger lever of the microswitch and automatically turns off the electric motor 3. The obvious wiring circuit is omitted for clarity.

Connected to an extension of the motor shaft on the other side of electric motor 3', Fig. 1, is a counter 40 of any well known type which registers the number of times a specimen is flexed before failure occurs.

*In operation.*—The specimen is clamped in position for flexing, as above described, and the electric motor rotates flexible shaft 6 together with eccentric 10 which is attached thereto. The rotation of eccentric 10 produces at the free end of flexible shaft 6 a centrifugal force which, were it not for the presence of lateral guide link 30, would cause the free end of flexible shaft 6, while rotating, to describe a circle, carrying with it through such circle rotating eccentric 10 and the lower end of vertical connecting rod 14. However, the presence of link 30 causes the lateral component of said centrifugal force to be resisted and in effect eliminated, leaving evident only the vertical component thereof. The motion of the free end of flexible shaft 6 is essentially and practically vertical. This vertical component of said centrifugal force, produced by the rotation of eccentric 10, is transmitted through bearing 15, Fig. 1, at the lower end of vertical rod 14, thence through this connecting rod to loading yoke 17, Figs. 2 and 5, bearings 19, 19, loading shaft 18 and thence to the end of specimen 1, which is gripped between clamp shaft 18 and plate 20, causing the specimen, whose other end is immovably held by clamping block 2, to be alternately flexed with a reversed bending load during each revolution of the motor shaft, first in an upward direction and then in a downward direction. The mounting of clamp shaft 18 in bearings 19, 19, avoids any undesirable binding or strain upon either end of the specimen, for when the movable end of the specimen is forced upwardly or drawn downwardly by the vibratory action of connecting rod 14 and loading yoke 17, the shaft 18 freely rotates, one way or the other to accommodate itself to the changing angle of said end of the specimen. When the specimen finally fails, the vertical component of the centrifugal force, being suddenly freed of the restraint imposed by the specimen, causes connecting rod 14 to vibrate through a greater distance. However, the first increased downward stroke of the end of flexible shaft 6, causes bearing 31 at the inner end of radius link 30 to strike the trigger lever of the micro-switch, as shown in Fig. 2, which turns off the electric motor and stops the machine.

From the disclosure herein, it is seen that I have provided a fatigue testing machine in which the eccentric weight is supported on a flexible shaft in a most unique manner so that its spring force may be effectively utilized for resisting the inertia effects of the reciprocating masses. By the realization that both of these functions can be obtained in a single rotating shaft, I am able to provide a compact low capacity and relatively inexpensive inertia compensated fatigue testing machine without in any way sacrificing the precision qualities necessary in an instrument of this type.

It will, of course, be understood by those skilled in the art that various changes may be made in the construction and arrangement of parts without departing from the spirit of the invention as set forth in the appended claims.

I claim:

1. A fatigue testing machine comprising, in combination, a flexible drive shaft rotatable at a constant speed and having eccentric means mounted thereon for rotation therewith to produce a centrifugal force and flexing said shaft, means for rigidly supporting one end of the shaft so that the axis of said end remains in a single stationary position at all times, means for rotating said shaft, means for operatively connecting a specimen to the flexing zone of said shaft at a fixed point remote from said rigidly supported end so that the centrifugal force is applied to the specimen upon flexure of the shaft, means for guiding said remote portion of the shaft so that said force produces substantially only a reciprocating movement thereof, and said shaft having a spring constant such as to compensate for the inertia forces of all reciprocating masses connected to the shaft, thereby to produce a load force in the specimen equal only to that of the centrifugal force.

2. The combination set forth in claim 1 further characterized in that the guiding means has provision for restraining lateral bending of the shaft while allowing it to bend substantially only in a direction at right angles thereto for applying the force to the specimen, and the means for operatively connecting the specimen to the shaft includes a link extending from the shaft in said right angle direction in which the centrifugal force is effective in inducing a loading force in the specimen.

3. The combination set forth in claim 1 further characterized in that the guiding means includes a radius link connected at one end to said shaft and means for supporting the other end of said link so that bending of the shaft occurs in only one plane, and means mounted on said link to compensate for different weights of specimen connecting means.

4. The combination set forth in claim 1 further characterized in that said shaft is a cantilever supported at its stationary end and whose remote end is adapted to have movement in proportion to the centrifugal force produced.

5. The combination set forth in claim 1 further characterized by the provision of an electric motor having a shaft and the flexible shaft constitutes a cantilever extension of the motor shaft to be supported solely thereby.

6. The combination set forth in claim 1 further characterized in that the flexible shaft is a tapered cantilever.

BENJAMIN J. LAZAN.

No references cited.